United States Patent [19]

Hayashi et al.

[11] Patent Number: 4,627,524
[45] Date of Patent: Dec. 9, 1986

[54] VISCOUS FLUID COUPLING DEVICE

[75] Inventors: Masaharu Hayashi; Masato Itakura, both of Toyota, Japan

[73] Assignee: Aisin Seiki Kabushiki Kaisha, Kariya, Japan

[21] Appl. No.: 542,199

[22] Filed: Oct. 14, 1983

[30] Foreign Application Priority Data

Oct. 22, 1982 [JP] Japan .................. 57-159734[U]

[51] Int. Cl.$^4$ .............................................. F16D 35/00
[52] U.S. Cl. .................. 192/58 B; 192/82 T
[58] Field of Search .................. 192/58 B, 82 T

[56] References Cited

U.S. PATENT DOCUMENTS

| | | | |
|---|---|---|---|
| 3,217,849 | 11/1965 | Weir | 192/58 B |
| 3,227,254 | 1/1966 | Sataruk | 192/58 B |
| 3,263,783 | 8/1966 | Sataruk | 192/58 B |
| 4,051,936 | 10/1977 | Crisenberg et al. | 192/82 T |
| 4,103,765 | 8/1978 | Tinholt | 192/82 T |
| 4,190,139 | 2/1980 | Tinholt et al. | 192/82 T |
| 4,295,550 | 10/1981 | Hayashi . | |
| 4,298,111 | 11/1981 | Hayashi . | |
| 4,381,051 | 4/1983 | Kikuchi | 192/58 B |
| 4,446,952 | 5/1984 | Masai | 192/58 B |
| 4,469,209 | 9/1984 | Hayashi et al. | 192/58 B |
| 4,502,580 | 3/1985 | Clancey | 192/58 B |
| 4,544,053 | 10/1985 | Yamaguchi et al. | 192/58 B |

FOREIGN PATENT DOCUMENTS 0069327  5/1980  Japan .................. 192/58 B

Primary Examiner—Randall L. Green
Assistant Examiner—H. A. Odar
Attorney, Agent, or Firm—Oblon, Fisher, Spivak, McClelland, & Maier

[57] ABSTRACT

A viscous fluid coupling device for controlling the transmission of an outpt torque in response to the ambient temperature of the device. The coupling device includes a valve plate for successively effecting first, second and third operational modes to maintain the output torque transmission respectively at low, medium and high levels. The valve plate is provided with a slot which is arranged to effect a fourth operational mode between the second and third operational modes thereby to reliably effect the second operational mode in response to a drop in the ambient temperature of the device.

6 Claims, 9 Drawing Figures

VISCOUS FLUID COUPLING DEVICE

BACKGROUND OF THE INVENTION

1. Field of the Invention

The present invention relates to viscous fluid coupling devices adapted for use in automotive vehicles, and more particularly to a viscous fluid coupling device capable of controlling the transmission of an output torque in response to the ambient temperature in three steps.

2. Discussion of the Background

A conventional viscous fluid coupling device of this kind is adapted to control the rotational speed of the radiator cooling fan mounted on an output member of the device. The conventional viscous fluid coupling device comprises a housing rotatably mounted on an input shaft to store therein a predetermined amount of viscous fluid, a rotor fixed to the input shaft and located in the housing, and a partition plate secured within the housing to subdivide the interior of the housing into an operation chamber containing therein the rotor and a portion of the viscous fluid and a reservoir chamber storing therein the remaining portion of the viscous fluid, the partition plate being provided at its outer peripheral portion with a first slot and a second slot spaced radially inwardly from the first slot. The fluid coupling device further comprises a first labyrinth between the partition plate and the rotor, a second labyrinth between the rotor and the inner wall of the housing, a valve plate rotatable in the reservoir chamber to open and close the slots to control the quantity of viscous fluid supplied into the labyrinths from the reservoir chamber respectively through the slots, thermally responsive means arranged to rotate the valve plate in response to changes in the ambient temperature of the coupling device, and pump means for returning the viscous fluid into the reservoir chamber from the operation chamber in accordance with relative rotation between the rotor and the housing.

In operation of the viscous fluid coupling device, the following first, second and third operational modes are effected in response to a rise in the ambient temperature of the coupling device. In the first operational mode, both the first and second slots are closed by the valve plate to minimize the shearing force of the viscous fluid in the first and second labyrinths so as to maintain the transmission of an output torque at a low level as indicated by the character B in FIG. 1. In the second operational mode, only the first slot is opened to increase the shearing force of the viscous fluid in the first labyrinth so as to maintain the transmission of the output torque at a medium level as indicated by the character C in FIG. 1. In the third operational mode, both the first and second slots are opened to further increase the shearing force of the viscous fluid in both the labyrinths so as to maximize the transmission of the output torque as indicated by the character D in FIG. 1. However, in the case that the fluid coupling device is supplied with high viscous fluid or designed to reduce relative rotation between the rotor and the housing as small as possible, the third operational mode changes to the first operational mode in response to fall of the ambient temperature without effecting the second operational mode as is indicated by the character A in FIG. 1. Such phenomenon is caused by the high viscous fluid remained in the second labyrinth after closing of the second slot or by insufficient pumping operation in the third operational mode. This results in excessive cooling of a prime mover of the vehicle, increase in noises of the cooling fan, increase in the power loss and the like.

SUMMARY OF THE INVENTION

It is, therefore, a primary object of the present invention is to provide an improved viscous fluid coupling device capable of reliably effecting the second operational mode in response to fall of the ambient temperature under various conditions.

According to the present invention, the primary object is accomplished by provision of an improved viscous fluid coupling device in which the valve plate is provided with a third slot to be overlapped with the first slot in the partition plate. With such an arrangement of the third slot in the valve plate, both the first and second slots are closed when the valve plate is in a first angular region, the first slot is overlapped with the third slot when the valve plate rotates over the first angular region and is in a second angular region, both the first and second slots are temporarily closed again when the valve plate rotates over the second angular region and is in a third angular region, and both the first and second slots are successively opened when the valve plate rotates over the third angular region. Thus, a fourth operational mode is effected between the second and third operational modes thereby to reliably effect the second operational mode in response to fall of the ambient temperature. In the actual practices of the present invention, it is advantageous that the third slot in the valve plate is designed to minimize the fourth operational mode in relation to the operational performance of the fluid coupling device.

BRIEF DESCRIPTION OF THE DRAWINGS

Additional objects, features and attendant advantages of the present invention will become more apparent upon reference to the following detailed description thereof, and to the drawings illustrating preferred embodiments thereof; in which.

DESCRIPTION OF THE PREFERRED EMBODIMENTS

Figure 3:
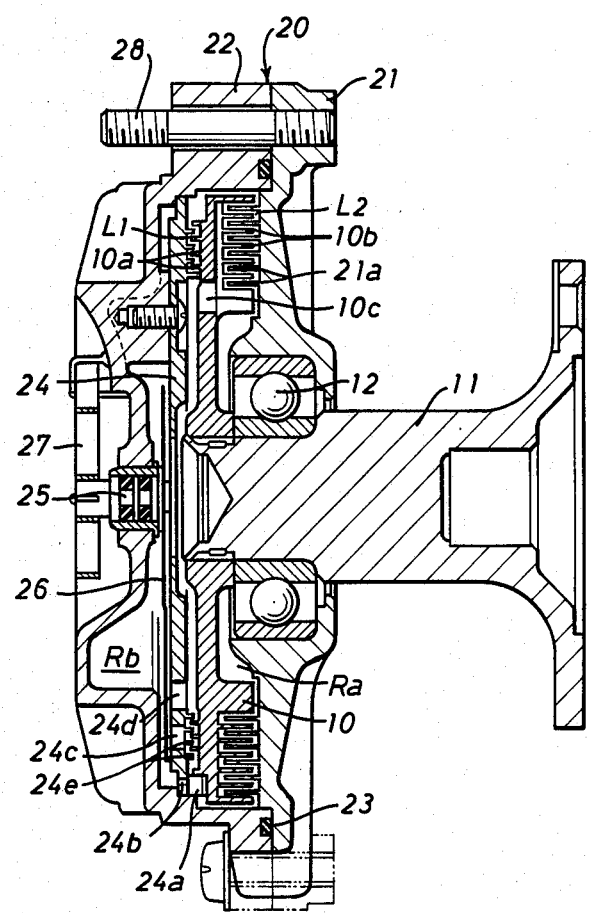
FIG. 3 is a sectional view of a preferred embodiment of the improved viscous fluid coupling device.

Referring now particularly to FIG. 3 of the drawings, a viscous fluid coupling device of the invention includes a rotor 10 fixed to a shaft 11 which is arranged as an input member to be driven by a prime mover of the vehicle. The rotor 10 has a first set of annular projections 10a and a second set of annular projections 10b which are integrally formed with the opposite faces of the outer peripheral portion of rotor 10. The rotor 10 is contained within an output member in the form of a housing assembly 20 which is rotatably mounted in a fluid-tight manner on shaft 11 and stores therein a predetermined amount of viscous fluid such as a silicone oil (not shown).

The housing assembly 20 includes a casing member 21 which is rotatably mounted in a fluid-tight manner on a neck portion of shaft 11 by means of a sealed ball bearing 12. The casing member 21 is integrally formed at its inner wall with a set of annular projections 21a which are coupled with the second set of annular projections 10b of rotor 10 to provide a labyrinth L2. The housing assembly 20 further includes a cover member 22 which is secured in a fluid-tight manner to an opening end of casing member 21 through an annular seal member 23. A circular partition plate 24 is coupled with an annular stepped portion of the inner wall of cover member 22 and secured in place to subdivide the interior of housing assembly 20 into an operation chamber Ra and a reservoir chamber Rb. The operation chamber Ra containes therein the rotor 10 and a portion of the viscous fluid, while the reservoir chamber Rb stores therein the remaining portion of viscous fluid.

Figure 4:
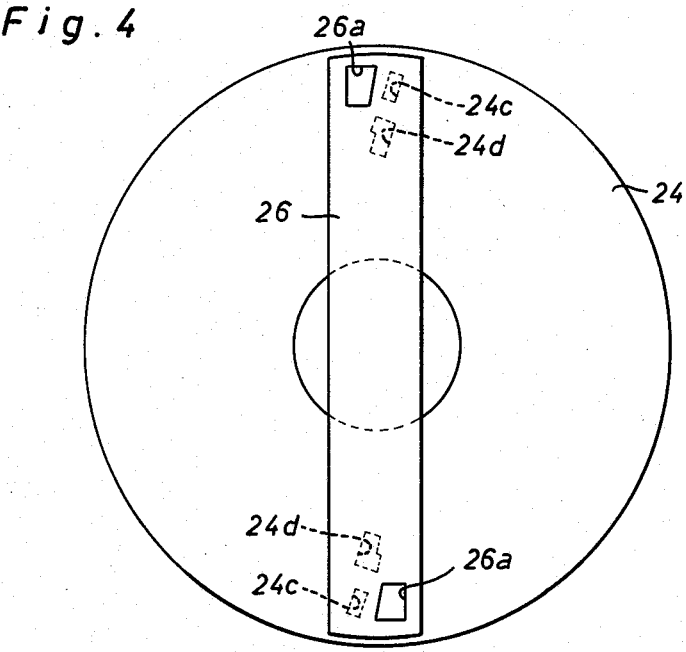
FIGS. 4–7 illustrate operational modes of the preferred embodiment.
Figure 5:
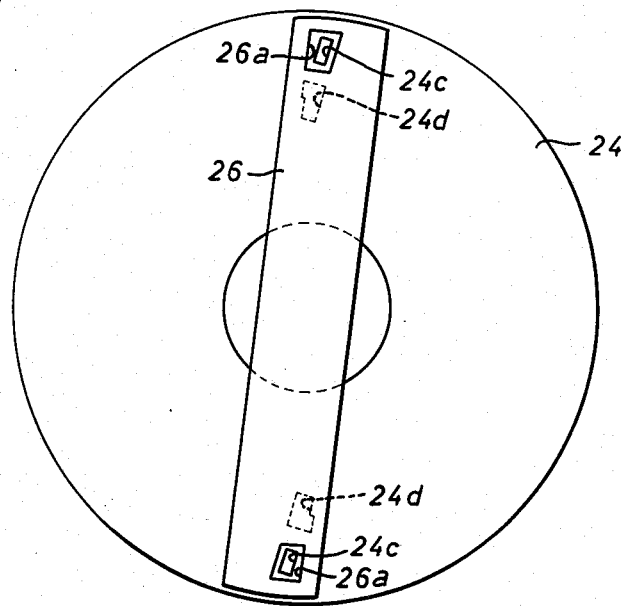
Figure 6:
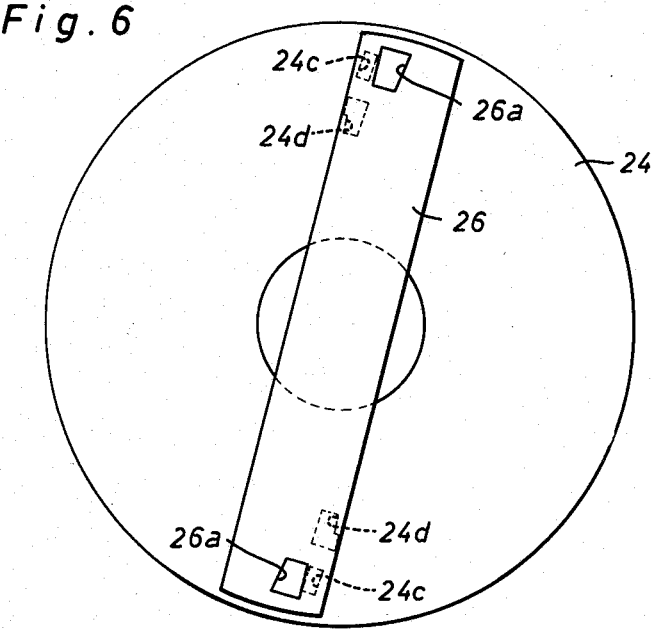
Figure 7:
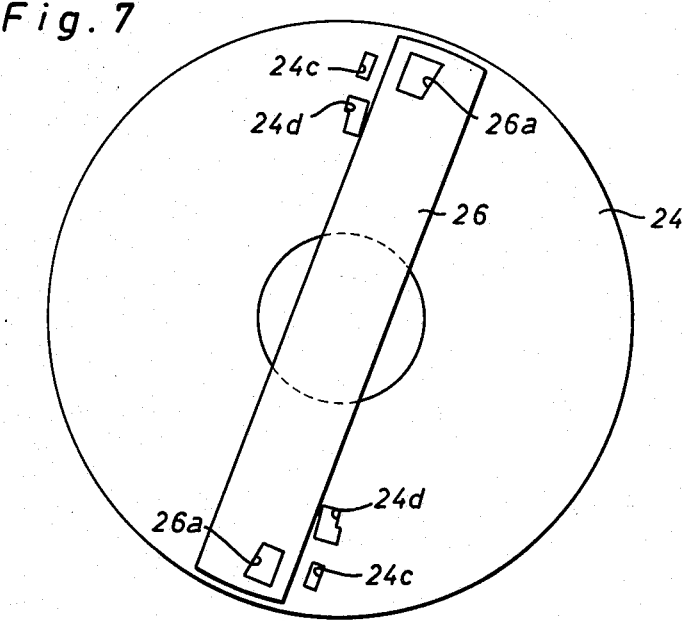

The partition plate 24 is provided at its outer peripheral portion with a pump projection 24a and an axial hole 24b which are arranged to provide pump means for returning the viscous fluid into the reservoir chamber Rb from the operation chamber Ra in accordance with relative rotation between the rotor 10 and the housing assembly 20. The pump projection 24a may be provided on the inner wall of cover member 22. As can be well seen in FIGS. 3 and 4, the partition plate 24 is further provided at its outer peripheral portion with a pair of rectangular first slots 24c and a pair of rectangular second slots 24d which are radially inwardly spaced from first slots 24c. The outer peripheral portion of partition plate 24 is integrally formed at its other end face with a set of annular projections 24e which are coupled with the first set of annular projections 10a of rotor 10 to provide a labyrinth L1. The first slots 24c are arranged adjacent the first labyrinth L1 to direct the viscous fluid into the labyrinth L1 therethrough, and the second slots 24d are arranged to direct the viscous fluid into the second labyrinth L2 through an axial hole 10c in rotor 10.

A rod 25 is rotatably mounted in a fluid-tight manner in the center of cover member 22, and a rectangular valve plate 26 is fixed to the inner end of rod 25 in the reservoir chamber Rb to rotate therewith. As can be well seen in FIG. 4, the valve plate 26 is arranged to open and close the first and second slots 24c, 24d in partition plate 24 so as to control the quantity of viscous fluid supplied into the labyrinths L1, L2 from the reservoir chamber Rb. The rod 25 is rotatably actuated by thermally responsive means in the form of a spiral type bimetal 27 one end of which is fixed to the cover member 22 and the other end of which is fixed to the outer end of rod 25 to effect rotation of the valve plate 26 about the axis of rod 25 in response to the ambient temperature of the prime mover. In use of the viscous fluid coupling device, a radiator cooling fan (not shown) is attached to the housing assembly 20 by means of bolts 28.

The viscous fluid coupling device described above is characterized in that the valve plate 26 is provided with a pair of rectangular third slots 26a which are arranged to be overlapped with the first slots 24c in partition plate 24, as is illustrated in FIGS. 4–7. When the temperature sensed by bimetal 27 is below a first predetermined value, the valve plate 26 is positioned in a first, angular region $\theta_1$ to close the first and second slots 24c, 24d in partition 24. (see FIG. 5) When the temperature sensed by bimetal 27 exceeds the first predetermined value and is below a second predetermined value higher than the first value, the valve plate 26 rotates clockwisely from the first angular region $\theta_1$ to a second angular region $\theta_2$ in which only the first slots 24c in partition 24 are overlapped with the third slots 26a in valve plate 26 to allow fluid flow passing therethrough. (see FIG. 5) When the sensed temperature by bimetal 27 exceeds the second predetermined value and is below a third predetermined value higher than the second value, the valve plate 26 rotates clockwisely from the second angular region $\theta_2$ to a third angular region $\theta_3$ in which both the first and second slots 24c, 24d are temporarily closed. (see FIG. 6) When the sensed temperature by bimetal 27 exceeds the third predetermined value, the valve plate 26 rotates further clockwisely beyond the third angular region $\theta_3$ to open both the first and second slots 24c, 24d in partition 24 successively.

Figure 1:
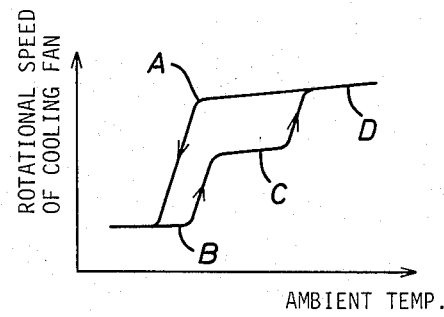
FIG. 1 is a graph illustrating the characteristic curves of a conventional viscous fluid coupling device.
Figure 2:
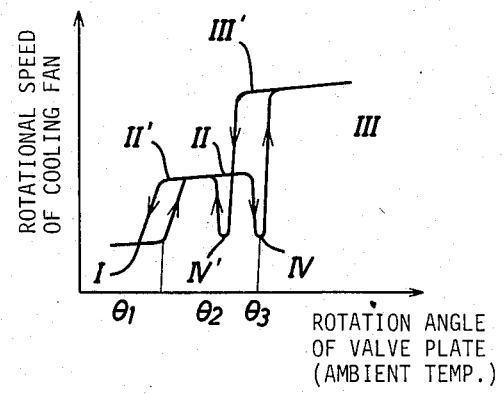
FIG. 2 is a graph illustrating the characteristic curves of an improved viscous fluid coupling device in accordance with the present invention.

In operation of the viscous fluid coupling device, the input shaft 11 is driven by the prime mover of the vehicle to produce a shearing force of the viscous fluid in the labyrinths L1 and L2, and the torque from input shaft 11 is transmitted to the output member 20 by the shearing force to rotate the cooling fan. When the temperature of the air across the radiator is below the first predetermined value in starting of the prime mover or in a cold season, the valve plate 26 is in a first angular position with respect to partition 24 corresponding to the first angular region $\theta_1$ to close both the first and second slots 24c, 24d in partition 24, and the quantity of viscous fluid in the operation chamber Ra is maintained at a minimum value by operation of the pump means. In such operations, both the labyrinths L1, L2 minimize the torque transmission between input shaft 11 and output member 20 to maximize relative rotation between rotor 10 and housing assembly 20. Assuming that the rotational speed of input shaft 11 is held constant, a relationship between the ambient temperature (or the angular position of valve plate 26) and the rotational speed of the cooling fan is maintained at a low level as indicated by the reference numeral I in FIG. 2. Such a condition is called hereinafter a first operational mode.

When the temperature of the air across the radiator exceeds the first predetermined value and is below the second predetermined value, the bimetal 27 acts to rotate the valve plate 26 clockwisely to a second position with respect to partition 24 corresponding to the second angular region $\theta_2$ so as to overlap the third slot 26a in valve plate 26 with the first slot 24c in partition 24. As a result, a portion of the viscous fluid in reservoir chamber Rb flows through the first and third slots 24c, 26a into the first labyrinth L1 in operation chamber Ra, while the viscous fluid in operation chamber Ra is returned by operation of the pump means into reservoir chamber Rb. Thus, the first labyrinth L1 effects the torque transmission between input shaft 11 and output member 20 while the relative rotation between rotor 10 and housing assembly 20 decreases. Assuming that the rotational speed of input shaft 11 is at the constant value as described above, the relationship between the ambient temperature and the rotational speed of the cooling fan is maintained at a medium level as indicated by the reference numeral II in FIG. 2, and will drop due to hysteresis of the bimetal 27 in response to fall of the ambient temperature as indicated by the reference numeral II' in FIG. 2. The above condition is called hereinafter a second operational mode.

When the temperature of the air across the radiator exceeds the second predetermined value and is below the third predetermined value, the bimetal 27 acts to rotate the valve plate 26 clockwisely to a third position with respect to partition 24 corresponding to the third angular region $\theta_3$. As a result, both the first and second slots 24c, 24d in partition 24 are closed by the valve plate 26 to return the supplied viscous fluid in labyrinth L1 toward the reservoir chamber Rb. In this instance, both the labyrinths L1, L2 minimize the torque transmission between input shaft 11 and output member 20, and the relative rotation between rotor 10 and housing assembly 20 is temporarily maximized. Thus, the relationship between the ambient temperature and the rotational speed of the cooling fan drops to the low level as indicated by the reference numeral IV in FIG. 2. If the ambient temperature falls at this stage, the above relationship will drop due to hysteresis of the bimetal 27 as indicated by the reference numeral IV' in FIG. 2. The above condition is called hereinafter a fourth operational mode.

When the temperature of the air across the radiator exceeds the third predetermined value, the bimetal 27 acts to further rotate the valve plate 26 with respect to partition 24 clockwise beyond the third angular region $\theta_3$ so as to open the first and second slots 24c, 24d in partition 24 successively. As a result, the first slots 24c allow the flow therethrough of viscous fluid from reservoir chamber Rb into the first labyrinth L1, while the second slots 24d allow therethrough the flow of viscous fluid from reservoir chamber Rb into the second labyrinth L2 across the axial hole 10c in rotor 10 to minimize the relative rotation between rotor 10 and housing assembly 20. Thus, the torque from input shaft 11 is transmitted to the output member 20 by shearing forces of the viscous fluid in both the first and second labyrinths L1 and L2. In such a condition, the relationship between the ambient temperature and the rotational speed of the cooling fan is maintained at a high level as indicated by the reference numeral III in FIG. 2. If the ambient temperature falls at this stage, the above relationship will drop due to hysteresis of the bimetal 27 as indicated by the reference numeral III' in FIG. 2. The above condition is called hereinafter a third operational mode.

From the above description, it will be understood that in operation of the preferred embodiment the fourth operational mode (IV, IV' in FIG. 2) is effected between the second and third operational modes (II, II'; III, III' in FIG. 2). Such effect of the fourth operational mode serves to reliably effect the second operational mode in response to fall of the ambient temperature thereby to avoid excessive cooling of the prime mover, an increase in the noise of the cooling fan, and an increase in the power loss of the prime mover.

Figure 8:
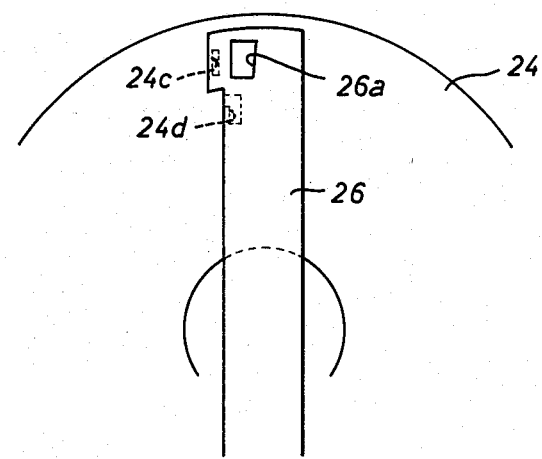
FIGS. 8 and 9 illustrate modifications of the preferred embodiment.
Figure 9:
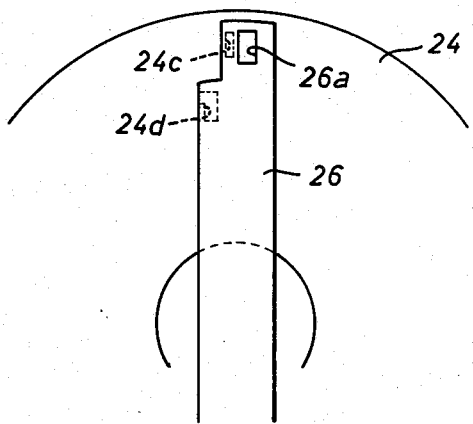

In the actual practice of the present invention, the shape of valve plate 26 and the arrangement of slots 24c, 24d, 26a may be modified as illustrated in FIGS. 8 and 9. Obviously, those skilled in the art may make various other changes in the details and arrangement of parts without departing from the spirit and scope of the invention as defined by the claims hereto appended, and it is therefore desired that the invention not be restricted to the exact construction herein disclosed.

What is claimed is:

1. A viscous fluid coupling device, comprising:
   a housing rotatably mounted on an input shaft to store therein a predetermined amount of viscous fluid;
   a rotor fixed to said input shaft and located in said housing;
   a partition plate secured in said housing to subdivide the interior of said housing into an operation chamber containing therein said rotor and a portion of the viscous fluid and a reservoir chamber storing therein the remaining portion of the viscous fluid, said partition plate being provided with a first slot and a second slot spaced radially inwardly from said first slot;
   a first labyrinth between said partition plate and said rotor to be supplied with the viscous fluid through said first slot from said reservoir chamber;
   a second labyrinth between said rotor and the inner wall of said housing to be supplied with the viscous fluid through said second slot from said reservoir chamber;
   a valve plate rotatable in said reservoir chamber to open and close said first and second slots to control the quantity of the viscous fluid supplied into said first and second labyrinths; and
   thermally responsive means arranged to rotate said valve plate in response to changes in the ambient temperature of said coupling device;
   wherein said valve plate is provided with a single slot to be overlapped with said first slot in said partition plate, and wherein said valve plate further comprises means for closing both said first and second slots in a first position of said valve plate with respect to said partition plate, for effecting overlapping of only said first slot and said single slot formed in said valve plate in a second position of said valve plate with respect to said partition plate, for closing both said first and second slots in a third position of said valve plate with respect to said partition plate, and for opening both said first and second slots in a fourth position of said valve plate with respect to said partition.

2. A viscous fluid coupling device as claimed in claim 1, wherein said first slot in said partition plate is arranged adjacent said first labyrinth.

3. A viscous fluid coupling device as claimed in claim 2, wherein said rotor is provided with an axial hole through which the viscous fluid across said second slot flows into said second labyrinth.

4. A viscous fluid coupling device as claimed in claim 1, wherein said valve plate is of a rectangular shape, and each of said first and second slots and said single slot formed in said valve plate is of a rectangular shape.

5. A viscous fluid coupling device as claimed in claim 1, wherein said first and second slots are arranged so as to be opened successively upon rotation of said valve plate to said third position.

6. A viscous fluid coupling device as claimed in claim 1, wherein said first and second labyrinths are arranged at the opposite faces of the outer peripheral portion of said rotor.

* * * * *